UNITED STATES PATENT OFFICE.

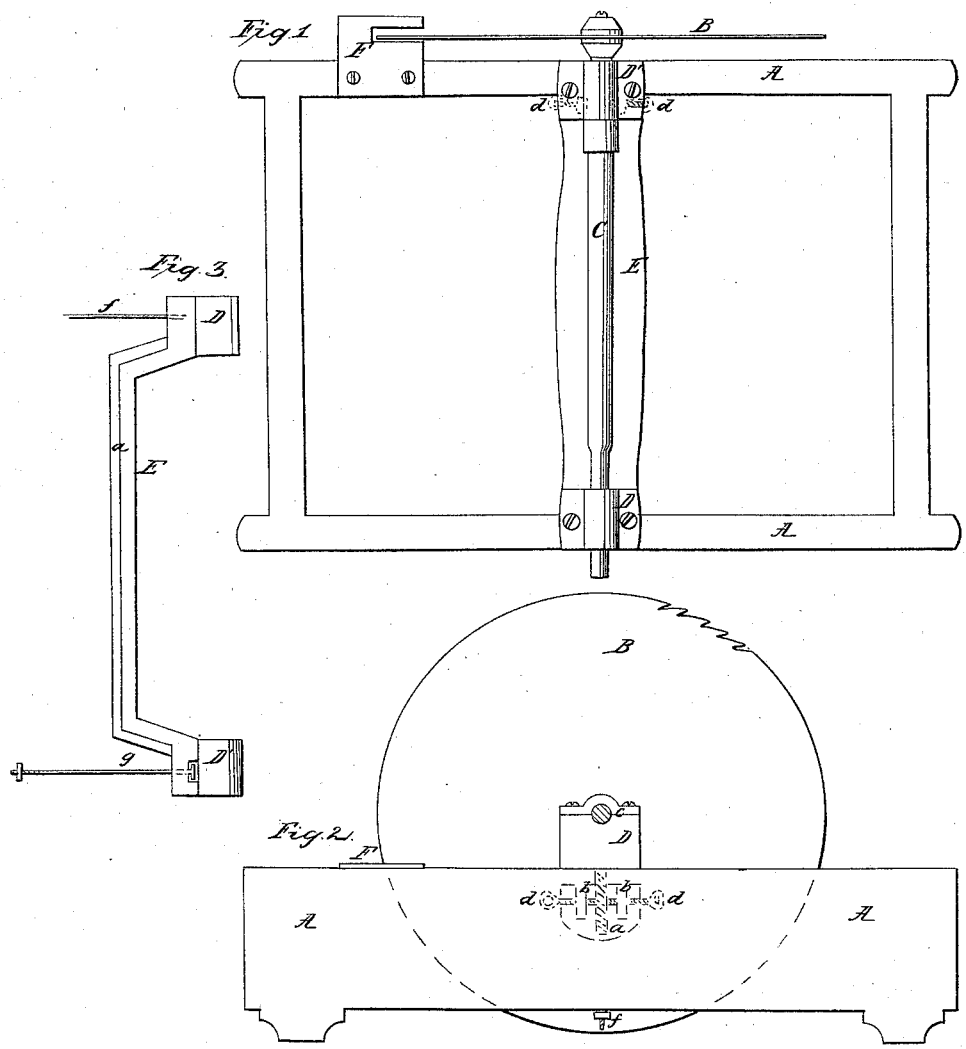

WM. McKINSTRY, OF WASHINGTON, DISTRICT OF COLUMBIA; ANN G. V. McKINSTRY. ADMINISTRATRIX OF SAID WM. McKINSTRY, DECEASED.

ADJUSTABLE BEARING FOR CIRCULAR SAWS.

Specification of Letters Patent No. 11,282, dated July 11, 1854.

*To all whom it may concern:*

Be it known that I, ANN G. V. McKINSTRY, of the city of Washington and District of Columbia, administratrix and executrix of WILLIAM McKINSTRY, deceased, late of the same place, do declare that the said WILLIAM McKINSTRY in his lifetime invented a new and useful Improvement in Circular-Saw Mills; and I do hereby declare that the following is a full, clear, and exact description thereof, reference being had to the accompanying drawings, making part of this specification.

The improvement consists in providing an accurate and ready adjustment of the bearings or boxes upon which the shaft (or the journals thereof) of the circular saw lie, especially in the use of long bearings, so operated in the shafts of circular saws. This is accomplished by using a long bedplate extending from box to box and on which they are placed; thus giving facility of not only fitting the shaft and journal, but trueing them at the machine shop, and thus keeping the run of the shaft under all circumstances, either from accidental wind in the mill frame, or any other cause; and thus preserve the accuracy of the adjustment given at the shop. This is an important improvement when it is taken into consideration, that in the ordinary mode of adjustment of the boxes for the purpose of clearing the back lash, or freeing the rear teeth from the cut of the log, the boxes themselves are moved independent of each other, by which without great skill it is impossible to accurately adjust and free the boxes from bearing on the journals of the shaft irregularly, whereas in this improvement the boxes are also secured against the jar as well as change of the frame, inasmuch if one is moved a consequent movement of the other box is induced.

The side motion of the bed is provided by the set screws acting on the bed plate; the holding or vertical bolts at each end of the plate having been previously loosened, the object of thus giving the plane of the saw a slight inclination from this line of the cut is to render the run of the saw easier, and also adjust the cut to the line of direction of the carriage.

In the accompanying drawings, Figure 1 a top view; Fig. 2, an elevation, and Fig. 3, bedplate detached.

A A the side pieces of the frame: B a circular saw of the ordinary construction: C the shaft: D D' boxes or bearings secured upon the plate E: F is a gage showing the movement of the saw: (*a*) is a rib on the underside of the plate E: *b b*ʰ are projections in and through which the set screws *d d* move, the ends of said saws bearing against the rib *a*: (*f*) is a long bolt tapped in the box D and passing through the side A serves as a turning point of the bed. (*g*) is a second long bolt connecting the head D' with the frame, this bolt has a large head passing through a slot in D': both *f* and *g* have screw or tightening nuts below the sides A A.

It will readily be perceived that the side or set screws *d d* being one turned to the right and the other to the left, will move the bedplate E, and the saw thus changed in its plane.

Having thus described the nature of the improvement what I claim as the invention of WILLIAM McKINSTRY (deceased) and desire to secure by Letters Patent is—

The arrangement of the bed plate E carrying the boxes D, D' in combination with the set screws *d d*, holding bolts *f* and *g*, shaft C and circular saw B as set forth.

ANN G. V. McKINSTRY,
*Administratrix and executrix of Wm. McKinstry, deceased.*

Witnesses:
SAML. GRUBB,
JNO. T. NEELY.